(12) United States Patent
Gebel

(10) Patent No.: US 12,392,491 B2
(45) Date of Patent: Aug. 19, 2025

(54) DUAL FUEL GAS TURBINE COMBUSTION CHAMBER MODULE HAVING AN ANNULAR COMBUSTION CHAMBER

(71) Applicant: Rolls-Royce Deutschland Ltd & Co KG, Blankenfelde-Mahlow (DE)

(72) Inventor: Gregor Christoffer Gebel, Ludwigsfelde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/662,660

(22) Filed: May 13, 2024

(65) Prior Publication Data
US 2024/0384874 A1 Nov. 21, 2024

(30) Foreign Application Priority Data
May 16, 2023 (DE) .................. 10 2023 204 572.9

(51) Int. Cl.
*F23R 3/36* (2006.01)
*F02C 3/20* (2006.01)
(Continued)

(52) U.S. Cl.
CPC ............ *F23R 3/36* (2013.01); *F02C 3/20* (2013.01); *F23R 3/286* (2013.01); *F23R 3/46* (2013.01); *F23R 3/283* (2013.01)

(58) Field of Classification Search
CPC ...... F23R 3/12; F23R 3/14; F23R 3/20; F23R 3/28; F23R 3/283; F23R 3/286; F23R 3/34; F23R 3/343; F23R 3/346; F23R 3/36
See application file for complete search history.

(56) References Cited

U.S. PATENT DOCUMENTS

| 5,323,604 A * | 6/1994 | Ekstedt | F23R 3/34 60/804 |
| 6,755,024 B1 * | 6/2004 | Mao | F23D 11/107 239/416 |

(Continued)

FOREIGN PATENT DOCUMENTS

| DE | 2910464 A1 | 9/1979 |
| DE | 102009019978 A1 | 11/2009 |

(Continued)

OTHER PUBLICATIONS

German Search Report dated Mar. 20, 2024 from counterpart German App No. 10 2023 204 572.9.

*Primary Examiner* — William H Rodriguez
(74) *Attorney, Agent, or Firm* — SHUTTLEWORTH & INGERSOLL, PLC; Timothy J. Klima

(57) ABSTRACT

The invention relates to a combustion chamber module having an annular combustion chamber, a feed device for fuel, and an injector assembly positioned in an annular configuration on a combustion chamber head and comprising injectors for feeding in the fuel. The feed device is configured for feeding in liquid and gaseous fuel. In addition to a first injector type for feeding in liquid fuel, the injector assembly has a second injector type, which is designed for feeding in gaseous fuel, in particular hydrogen, wherein the feed device can be controlled in such a way that the first injector type and the second injector type are not supplied simultaneously with fuel.

20 Claims, 7 Drawing Sheets

(51) Int. Cl.
*F23R 3/28* (2006.01)
*F23R 3/46* (2006.01)

(56) References Cited

U.S. PATENT DOCUMENTS

| | | | |
|---|---|---|---|
| 9,400,113 B2* | 7/2016 | Ogata | F23R 3/286 |
| 9,874,351 B2 | 1/2018 | Wolfe | |
| 11,846,426 B2* | 12/2023 | Giridharan | F02C 3/30 |
| 2009/0044538 A1* | 2/2009 | Pelletier | F23R 3/14 |
| | | | 60/740 |
| 2014/0123665 A1 | 5/2014 | Wood | |
| 2014/0291418 A1 | 10/2014 | Ruffing et al. | |
| 2015/0059353 A1* | 3/2015 | Asai | F23R 3/26 |
| | | | 60/785 |
| 2016/0033131 A1* | 2/2016 | Ogata | F23R 3/46 |
| | | | 60/737 |
| 2016/0076461 A1* | 3/2016 | Kawai | B64D 37/30 |
| | | | 60/39.463 |
| 2016/0258629 A1* | 9/2016 | Slobodyanskiy | F23N 5/003 |
| 2017/0248078 A1* | 8/2017 | Hannwacker | F23R 3/283 |
| 2018/0100653 A1 | 4/2018 | Wood | |
| 2019/0093897 A1* | 3/2019 | Staufer | F23R 3/14 |
| 2021/0207541 A1* | 7/2021 | Snyder | F02C 7/228 |
| 2022/0082055 A1* | 3/2022 | Hucker | F02C 7/36 |
| 2022/0268213 A1* | 8/2022 | Morenko | F23R 3/12 |
| 2022/0356845 A1* | 11/2022 | Morenko | F23D 11/107 |
| 2022/0412563 A1* | 12/2022 | Giridharan | F23R 3/346 |

FOREIGN PATENT DOCUMENTS

| | | |
|---|---|---|
| DE | 102022201182 A1 | 8/2023 |
| DE | 102022202936 A1 | 9/2023 |
| DE | 102022202937 A1 | 9/2023 |

* cited by examiner

DUAL FUEL GAS TURBINE COMBUSTION CHAMBER MODULE HAVING AN ANNULAR COMBUSTION CHAMBER

This application claims priority to German Patent Application 10 2023 204 572.9 filed May 16, 2023, the entirety of which is incorporated by reference herein.

The invention relates to a combustion chamber module having an annular combustion chamber, a feed device for fuel, and an injector assembly positioned in an annular configuration on a combustion chamber head and comprising injectors for feeding in the fuel.

A combustion chamber module of this kind having an annular combustion chamber is specified in US 2014/0291418 A1 in combination with a gas turbine, in particular for an engine of an aircraft. The combustion chamber module comprises an outer housing, in which an annular combustion chamber supplied with fuel via an injector assembly is arranged. The injectors of the injector assembly are mounted on the outer housing via shafts with flange joints. The individual injectors are arranged circumferentially adjacent to one another on a combustion chamber head of the annular combustion chamber. The fuel is injected into the combustion space via nozzles with a plurality of groups of outlet openings.

Nozzle assemblies for a combustion chamber and a corresponding engine are also shown in German Patent Application DE 10 2022 202 937.2, not a prior publication, and DE 10 2022 202 936.4, not a prior publication. In this case, a nozzle assembly is present for injecting hydrogen into a combustion space, and this nozzle assembly is also suitable for injecting other fuels, especially gaseous fuels.

Figure 1:
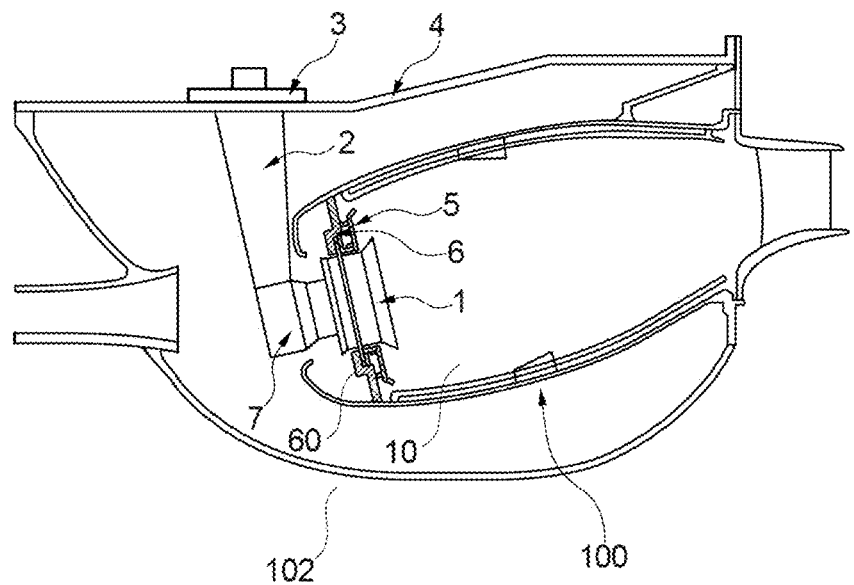
Figure 2:
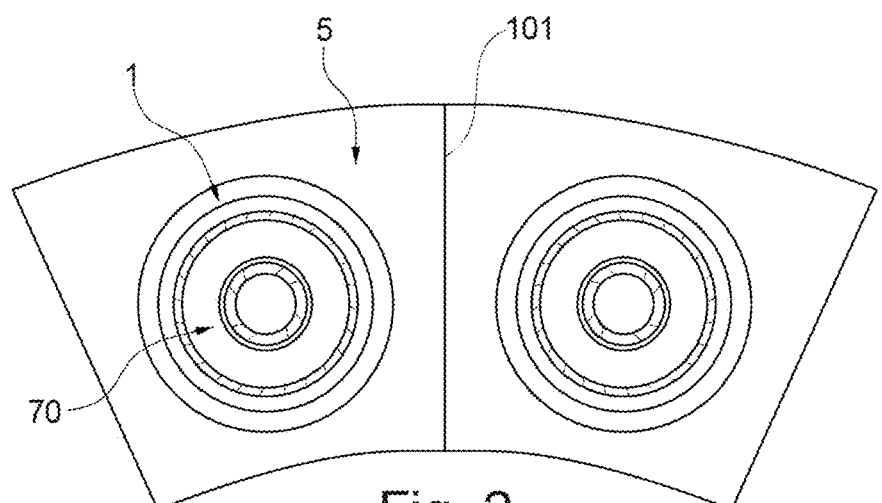

FIG. 1 shows a side view of a conventional combustion chamber module having an outer housing 4, in which there is arranged an annular combustion chamber 100 with a combustion space 10, to which liquid fuel, for example, is fed via an injector assembly 7. The injector assembly 7 has a plurality of injectors, which are arranged spaced apart in the circumferential direction on an annular head wall 60 of a combustion chamber head 6 and are secured on the wall of the outer housing 4 via a respective shaft 2 by means of a flange 3. In this case, the injectors of the injector assembly 7 are installed with the insertion of a rotationally symmetrical seal 1, which is held in position by means of a circumferential rib between an air-cooled heat shield 5 and the head wall 60 of the combustion chamber head 6. The shaft 2 also contains a fuel feed line, which opens into the internal fuel channels of the relevant injector. The shaft 2 itself projects radially outwards through the outer housing 4 of the combustion chamber module 102 and is screwed to the latter on the outside thereof via the flange 3, which is provided with a seal for sealing the passage hole in the outer housing. The flange 3 is also provided with a connection, onto which a hose or a pipe for supplying fuel can be screwed by means of a union nut. FIG. 2 shows a detail of the combustion chamber head in the axial upstream direction, wherein two injectors for liquid fuel are arranged centrally in a respective sector. A sector boundary 101 runs centrally between the two injectors along a radial line.

In order to make available future-ready combustion chamber modules, in particular also for aero engines, a significant reduction in $CO_2$ emissions is required. One possibility for achieving this aim is to burn gaseous fuels, especially hydrogen, instead of liquid fuels consisting of hydrocarbons. Since hydrogen requires a new infrastructure for production, transport and storage, it is not yet available at all airports. Combustion chamber modules, in particular also for aero engines, are therefore being developed which can operate both in a conventional way with liquid fuel and with gaseous fuel, in particular hydrogen. However, a satisfactory technical solution for this is difficult since, when adapting for new engines, a compromise repeatedly has to be found between specific requirements, such as ignitability, flame stability, emissions of nitrogen oxides and, where applicable, other pollutants and thermoacoustic resonance.

It is the underlying object of the present invention to provide a combustion chamber module, in particular for an aero engine, which allows operation both with liquid and with gaseous fuels, in particular hydrogen, while complying as well as possible with the various requirements.

This object is achieved in an advantageous way in the case of a combustion chamber module having features as disclosed herein.

According to the invention, it is envisaged that the feed device is configured for feeding in liquid and gaseous fuel in such a way that, in addition to a first injector type for feeding in liquid fuel, the injector assembly has a second injector type, which is designed for feeding in gaseous fuel, in particular hydrogen, and the feed device can be controlled in such a way that the first injector type and the second injector type are not supplied simultaneously with fuel. For this purpose, the feed device has separate fuel systems for the two fuels. The fuel supply to the first and second injector type is selected by means of a control device that acts on the feed device.

By virtue of the configuration of the combustion chamber module with the injector assembly which comprises the first injector type for feeding in liquid fuel and the second injector type for feeding in gaseous fuel, in particular hydrogen, and in which the feed device is designed in such a way that the injectors of the first injector type and the injectors of the second injector type are not supplied simultaneously with hydrogen, the injectors of the first injector type and of the second injector type can be optimized largely independently of one another to satisfy requirements of the kind stated (e.g. ignitability, flame stability, emissions of soot and other pollutants and thermoacoustic resonance).

For operation, it is advantageously envisaged here that, where air passages are present, there is always a flow of air through the injectors of both injector types. If the air passages are fitted with swirl elements, a swirl is accordingly imposed on the air flow.

A configuration that is advantageous for construction and operation consists in that the injectors of the second injector type are each arranged in pairs as an injector pair on the combustion chamber head—one being located radially further in and one being located radially further out.

In this case, provision is advantageously made as regards operation and construction that the injectors of the first injector type are arranged alternately in the circumferential direction with the injectors of the second injector type, which are grouped in pairs.

For construction and operation, it is furthermore advantageous that each injector pair of the injectors of the second injector type is mounted on a common shaft, which contains a common fuel line for both injectors of the injector pair and is secured on an outer housing.

Further advantageous measures for the construction and operation of the combustion chamber module consist in that the combustion chamber head has a head wall and a heat shield, and, for each injector of the injector assembly, has a dedicated, in particular circular, opening, through which the associated injector projects into the interior of the combustion chamber.

Another contributory factor to advantageous operation is that a seal, which is mounted in a floating manner, is inserted between the injector and the opening to prevent air from flowing into the combustion space in an undefined manner, in particular as a result of thermal deformation or installation and manufacturing tolerances. In this case, the floating mounting is advantageously designed in such a way that the seal can be displaced slightly both in the plane of the combustion chamber head and also axially with respect thereto. Stresses due to thermal expansion are thus avoided.

Other contributory factors to advantageous operation and advantageous construction are the measures that the injectors of the second injector type have a central fuel tube with or without a swirl element for passing the gaseous fuel, in particular hydrogen, axially into the combustion space of the combustion chamber, wherein the fuel tube is bounded by an annular air gap, which is designed to produce an axial momentum of the air flow which is so high that the zones of chemical combustion reactions are shifted away from the injector into the combustion space.

Further advantages for construction and operation are obtained by virtue of the fact that the annular air gaps on the injectors of the second injector type are provided with entry lips, which are arranged axially upstream of the seal.

In an advantageous configuration, the operation of the combustion chamber module is also promoted by virtue of the fact that a restrictor element, in particular a flow screen, which equalizes the mass flow of the two injectors with respect to one another and makes the flow field more uniform, is arranged in or close to a respective transition plane from the shaft to the injector of both injectors connected to the same fuel line.

Further measures for advantageous construction and stable design consist in that the fuel line forms a one-piece integral part of the shaft, which is produced by 3D printing for example, or is produced as a separate component and is connected in a stable manner to the shaft, in particular by means of welding or brazing.

Here, operation and construction are facilitated by the measures that the shaft and the fuel line are separated from one another by means of a thermally insulating gap, wherein the gap is unfilled or filled with air or some other gas of low thermal conductivity or even with a solid of low thermal conductivity.

Further advantageous measures for the construction of the combustion chamber and for efficient operation are obtained in that the annular combustion chamber is divided, when viewed in the upstream direction, into sectors, wherein each combustion chamber sector forms a segment of the circumference of the combustion chamber which extends from a centre, forming a radial sector boundary, between two injectors of the first injector type to the next centre, forming a further radial sector boundary, between two injectors of the first injector type, and the two injectors of an injector pair of injectors of the second injector type are arranged in matching recesses on the sector boundaries.

In a further development, it is advantageously envisaged here that the heat shield is composed of heat shield segments, the radially extending dividing lines of which, when viewed in the upstream direction, coincide with the sector boundaries apart from a small gap—to compensate for mechanical stresses due to thermal expansion and manufacturing and installation tolerances.

If it is envisaged that an imaginary quadrilateral, the sides of which connect the central points of two injectors of the first injector type which are adjacent in the circumferential direction to the central points of the two injectors of an injector pair of the second injector type which lie in the centre therebetween on a radial line, forms a kite, of which the angle ($\delta$) that is located radially further in is greater than the angle ($\gamma$) thereof that is located radially further out and of which the two angles ($\beta$) that are located laterally with respect to the radial line are equal and in the range of from 30° to 90°, it is ensured that, other than is the case with arrangement in an ideal rhombus shape for example, the injector for the gaseous fuel (i.e. of the second injector type) which is situated radially on the inside is not located very close to the combustion chamber inner wall. As a result, a flow field which is favourable for complete and rapid combustion is obtained, and protection for the combustion chamber inner wall against excessive thermal stress due to the flame of the injector for the gaseous fuel which is situated radially on the inside is achieved.

Another advantageous measure for operation consists in that the central longitudinal axes of the shafts of the two injector types do not run parallel, in particular run at an angle of 10° or greater to one another, in side view. As a result, the injectors can be supplied relatively well with diffuser air, despite the increased number of shafts, and air for cooling the combustion chamber wall can also still be fed effectively to an outer annular gap. In this case, air compressed and heated by a compressor enters the space containing the combustion chamber and the outer annular gap via a diffuser downstream of the compressor outlet. Here, the outer annular gap is the section of the space containing the combustion chamber which is situated radially on the outside with respect to the combustion chamber. In this case, the aerodynamic barrier that is formed on account of the number of shafts is kept as small as possible.

Also leading to corresponding advantages are the further measures that the shafts of the second injector type, in particular, are provided with ribs that project outwards, in particular radially, in axial plan view and that are embodied without or—preferably—with apertures.

Corresponding advantages are obtained for the engine having at least one combustion chamber module embodied as described above.

Figure 3:
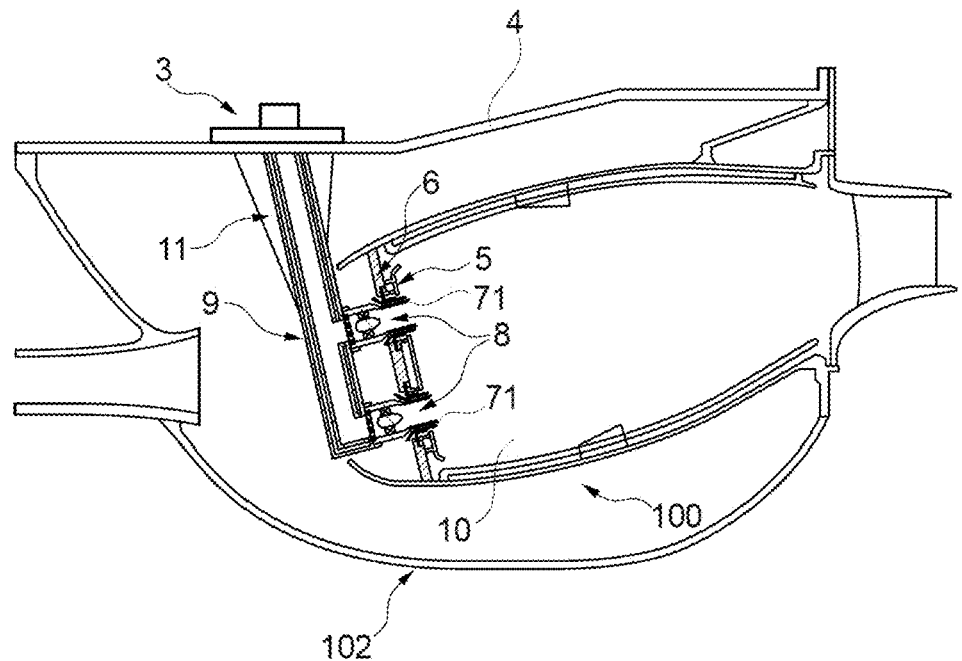
Figure 4:
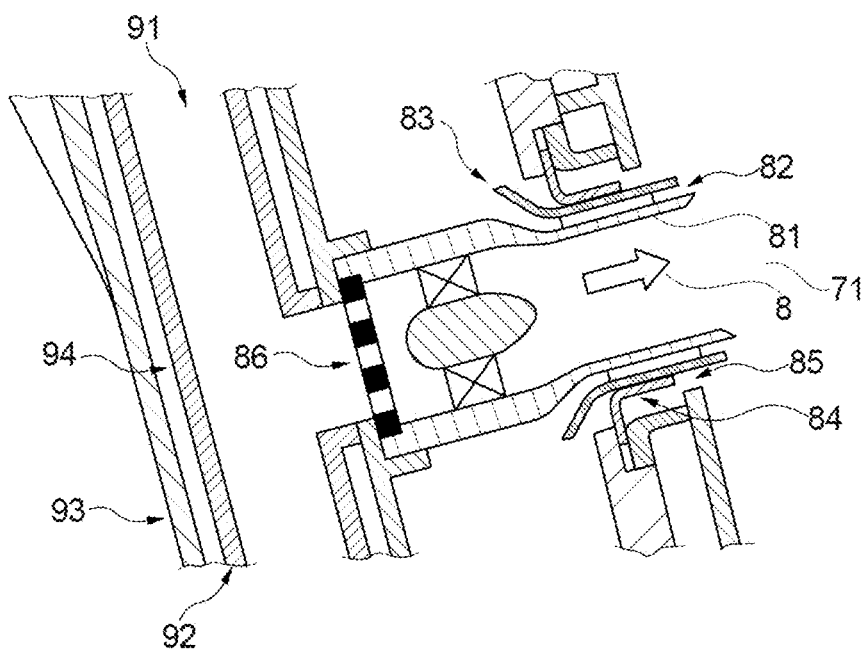
Figure 5:
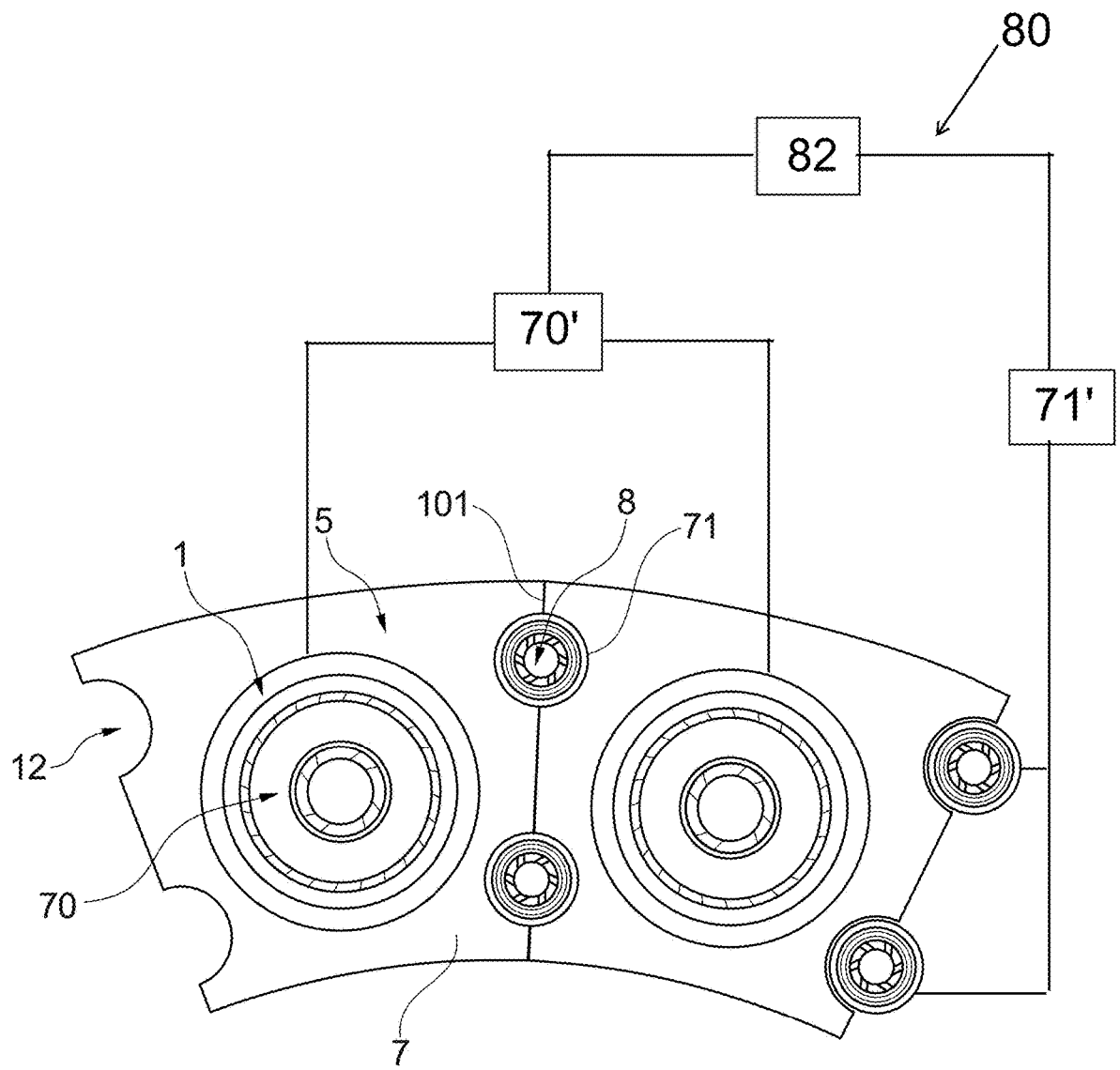
Figure 6:
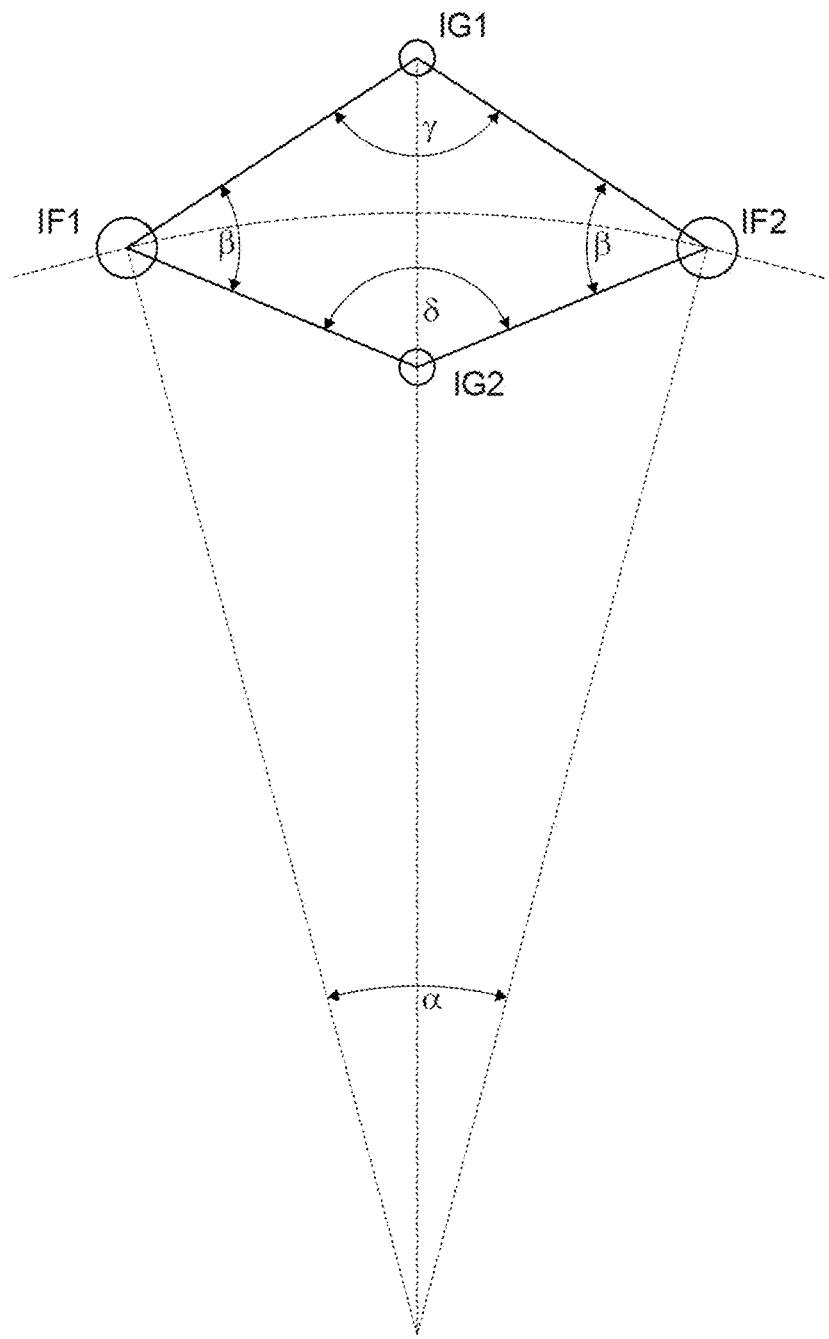
Figure 7:
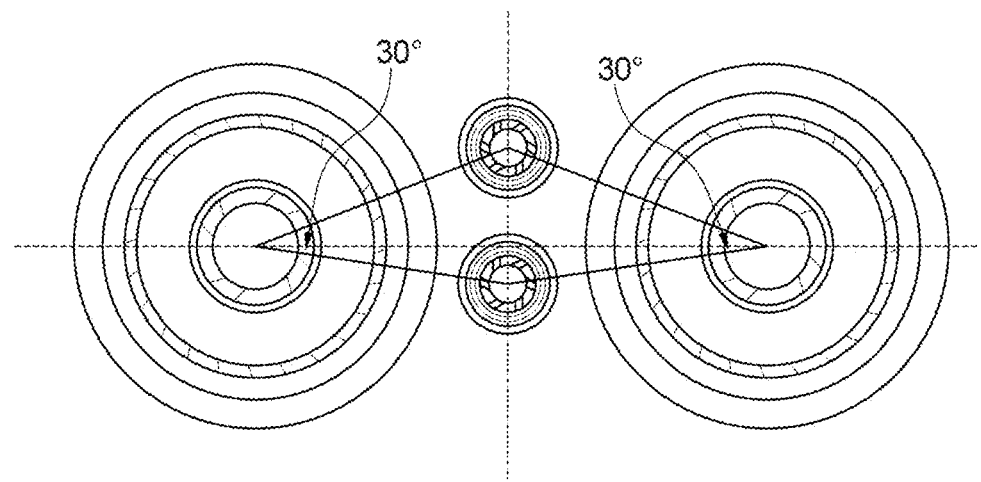
Figure 8:
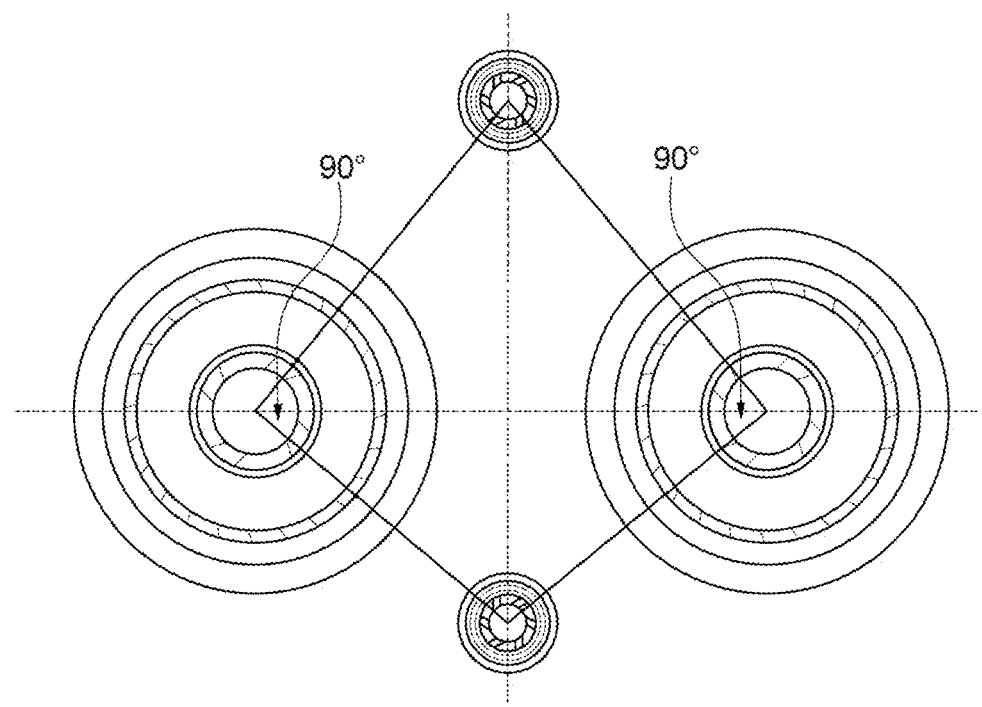
Figure 9:
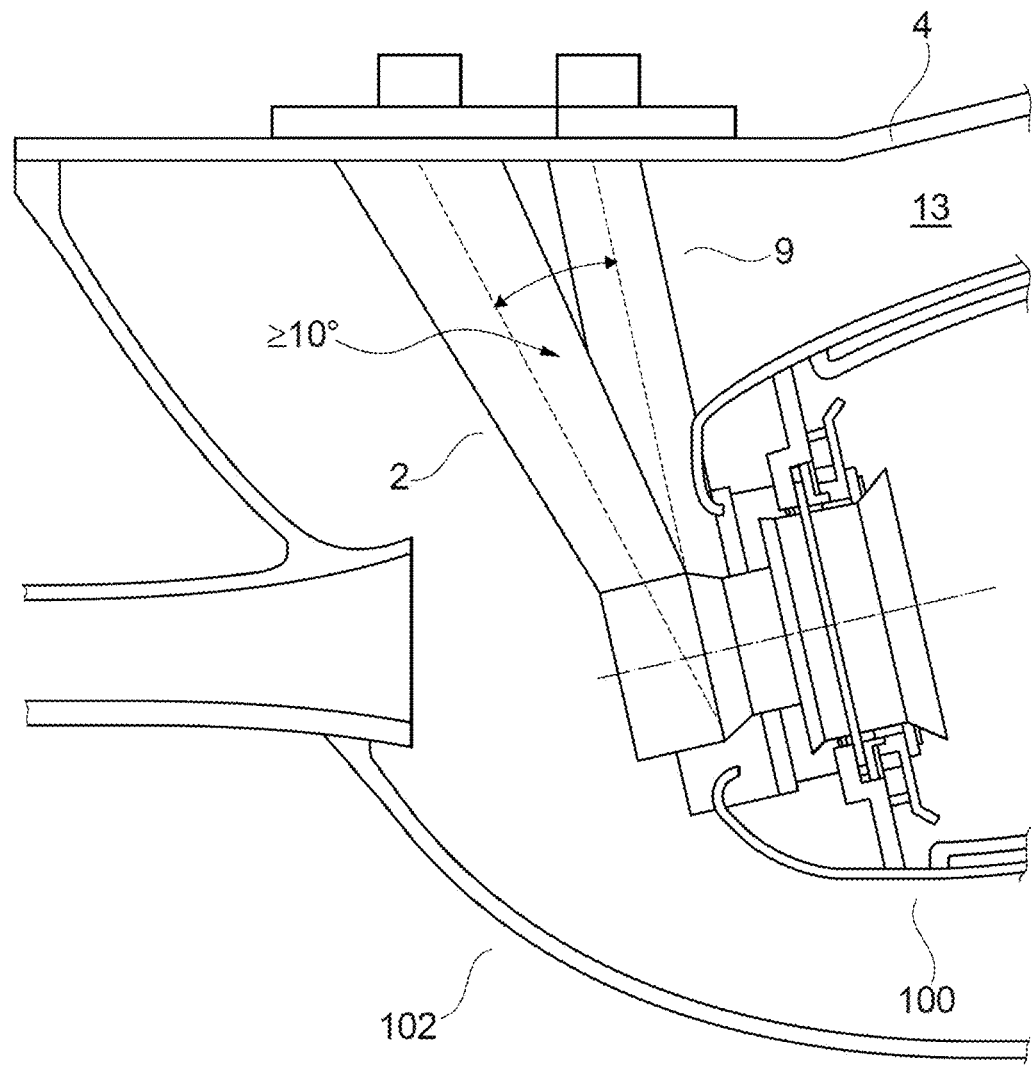
Figure 10A:
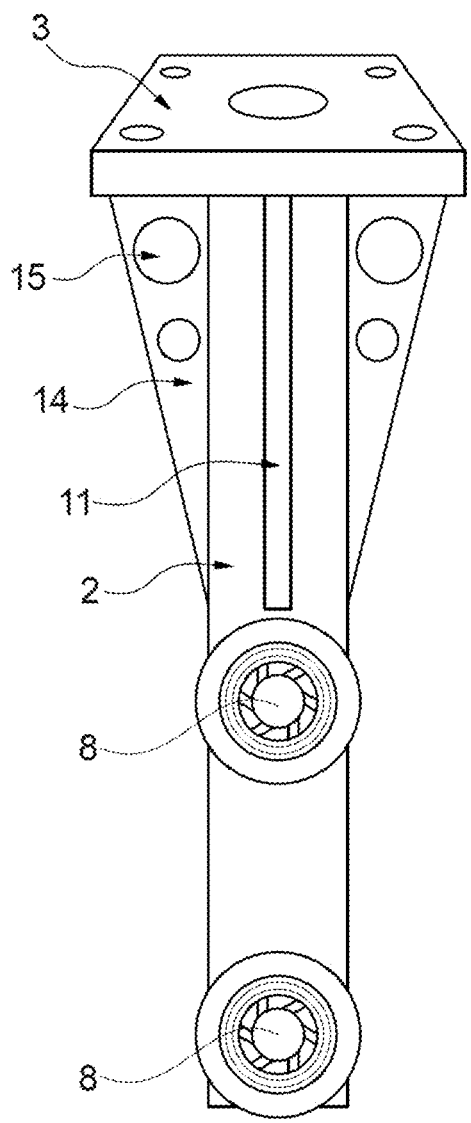
Figure 10B:
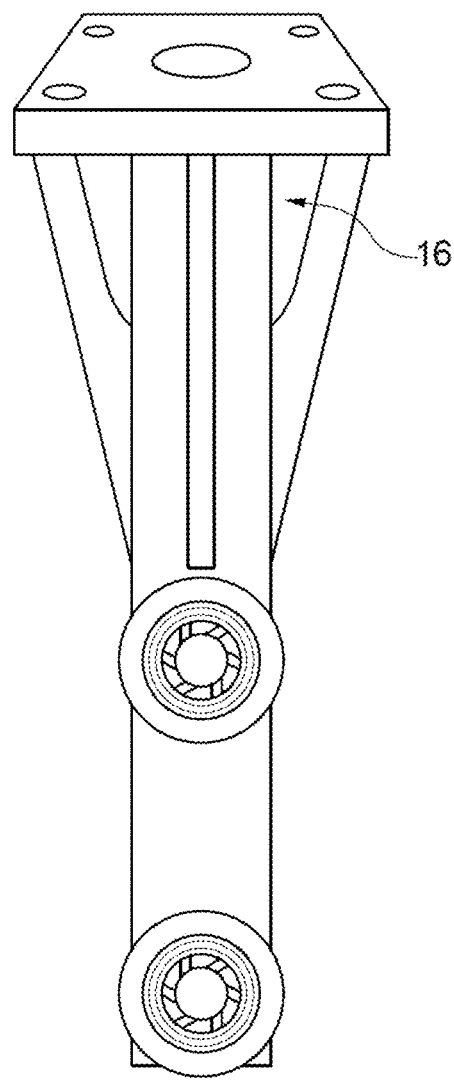

The invention is explained in greater detail below with reference to exemplary embodiments. In the drawing:

FIG. 1 shows a combustion chamber module for an aero engine having a combustion chamber and parts of an injector assembly according to the prior art in a sectioned view from the side, FIG. 2 shows a detail of a combustion chamber head of the combustion chamber with two injectors for liquid fuel according to the prior art in axial view in the upstream direction, FIG. 3 shows a combustion chamber module according to the invention having a combustion chamber and parts of an injector assembly in a sectional view from the side, FIG. 4 shows an enlarged detail of a combustion chamber module according to FIG. 3 in the region of the injector assembly in a sectional view from the side, FIG. 5 shows a detail of the combustion head of the combustion chamber according to FIG. 3 with parts of the injector assembly having injectors of a first injector type for liquid fuel and a second injector type for gaseous fuel in an axial view in the upstream direction, FIG. 6 shows an illustration relating to the geometrical arrangement of injectors shown in FIG. 5, FIG. 7 and FIG. 8 show further illustrations of geometrical arrangements of injectors of the first and of the second injector type in an axial view in the upstream direction, FIG. 9 shows a detail of a combustion chamber module in the region of the injector assembly in a view from the side with a different inclination of the shaft of an injector of the first injector type and of the shaft of an injector of the second injector type, FIGS. 10A and 10B show a (partially perspective) illustration relating to the design of the shafts of injectors of the second injector type.

As described initially, FIG. 1 shows, in a sectional view from the side, a combustion chamber module 102 having an annular combustion chamber 100, the combustion space 10 of which is supplied via an injector assembly 7 (shown in part) having injectors of an injector type for liquid fuel. Here, the injectors of the injector assembly 7 are arranged offset from one another in a correspondingly annular fashion in a head wall 60 of a combustion chamber head 6 of the annular combustion chamber 100. FIG. 2 shows, in a schematic illustration, a detail of the combustion chamber head 6, from which the annular arrangement of the injectors of the first injector type 70 can be seen in an axial view in the upstream direction. Here, the injectors for the liquid fuel are located in a rotationally symmetrical seal 1, which is held in position by means of a circumferential rib between an air-cooled heat shield 5 of the head wall 60 of the combustion chamber 6 (see FIG. 1). In order to avoid stresses due to thermal expansion, the seal 1 is mounted in a floating manner, i.e. it can be displaced slightly both in the plane of the combustion chamber head 6 and also axially with respect thereto.

As FIG. 1 furthermore shows, the illustrated injector itself is connected at its upstream end to a shaft 2, which also contains the fuel feed line, which opens into the internal fuel channels of the injector. The shaft 2 itself projects radially outwards through the outer housing 4 of the combustion chamber module 102 and is screwed to the latter on the outside thereof via a flange 3. The flange 3 has a seal, by means of which the hole for the shaft 2 in the outer housing is sealed in a gas-tight manner. It is furthermore provided with a connection, onto which a hose or a pipe for supplying fuel can be screwed, e.g. by means of a union nut.

As FIG. 2 shows (in the form of a detail), the annular combustion chamber 100 (ring-type combustion chamber) or combustion chamber head 6 is divided into sectors, wherein an injector of the first injector type 70 for liquid fuel is arranged in each sector and mounted in a manner sealed by means of the rotationally symmetrical seal 1. The sectors are each separated from one another in the centre between two injectors by a radially extending dividing line (radial line), the sector boundary 101.

In the design according to the invention of the combustion chamber module 102, which is shown in FIG. 3, the injector assembly is expanded, in addition to the injector group for liquid fuel, by a second injector group comprising injectors of a second injector type 71 for gaseous fuel, in particular hydrogen, which are optimized for injection of the gaseous fuel. For feeding in the liquid and gaseous fuel, there is a feed device 80, which is designed in such a way that the two injector types 70, 71 are not supplied simultaneously with fuel; the combustion chamber 100 is supplied with the liquid or gaseous fuel either by one injector type 70 or the other injector type 71. For feeding in the respective fuel, both injector types 70, 71 have fuel systems with a fuel supply 70', 71' that can be controlled separately by means of a control device 82. During operation, there is a continuous flow of air through any air passages that may be present in the two injector types 70, 71. If the air passages are fitted with swirl elements, a swirl is accordingly imposed on the air flow.

FIG. 3 shows an illustrative configuration of injectors of the second injector type 70 for the gaseous fuel in a sectioned side view with the combustion chamber 100, in which the combustion space 10 is located.

FIG. 4 shows an enlarged detail in the region of a single injector of the injector type 71 for gaseous fuel and its integration into the combustion chamber head 6, comprising the head wall 60 of the combustion chamber 100 and the heat shield 5. Similar injectors are also shown in the two Germans Patent Applications DE 10 2022 202 937.2 and DE 10 2022 202 936.4, not prior publications, of the applicant, wherein a difference with respect to these injectors, apart from the arrangement according to the invention and measures for mounting, is that a second air passage with swirling which is described there is not present in the exemplary embodiment under consideration. In the present case, namely, the injectors for the liquid fuel (injectors of the first injector type 70) allow swirled air to flow into the combustion chamber even when they are not being supplied with fuel, as described above. This results in the formation of a recirculation zone ahead of each injector in the combustion chamber 100, into which zone the gaseous fuel injected by the second injector group (injectors of the second injector type 71) is coupled, thus ensuring that high quality mixture preparation as well as complete combustion and good flame stability are achieved.

As FIG. 3 shows, the injectors of the second injector type for the gaseous fuel 8 are each arranged in pairs. Each injector pair consists of an injector seated radially on the outside and an injector seated radially on the inside. Their longitudinal axes are both arranged axially with respect to the combustion chamber longitudinal axis (or parallel to the longitudinal axes of the injectors of the first injector type 70 for the liquid fuel). Each injector pair is seated on a common shaft 9, in which a common fuel line 91 for both injectors is located. The combustion chamber head 6, comprising the head wall 60 and the heat shield 5, has a dedicated circular opening 85 for each of the injectors, through which the relevant injector can project into the combustion chamber 100. To prevent an undefined quantity of air from flowing around the injector, through the opening, into the combustion chamber 100 or combustion space 10 thereof as a result of thermal deformation and installation and manufacturing tolerances, each injector is surrounded by a seal 84, which can be mounted in a floating manner.

When the injectors for gaseous fuel of the construction described above are used, the gaseous fuel or hydrogen is passed axially into the combustion chamber 100 through a central fuel tube 81 shown in FIG. 4. The central fuel tube 81 can have a swirl element. The central fuel tube 81 is surrounded by an annular air gap 82, which allows an air flow to flow into the combustion space 10 of the combustion chamber 100 at a relatively high axial speed and with little or no swirl. The purpose of this air flow is to shift the zones of chemical combustion reactions as far as possible away from the injector into the combustion space 10 by means of a high axial momentum of the air flow and thus protect the injector and the combustion chamber wall from thermal overloading. The annular air gap 82 can be provided with entry lips 83, which are located axially upstream of the seal 84.

The central fuel tube 81 is supplied with fuel via the fuel line 91 in the shaft 9 of the injector. In order to ensure that both injectors of the injector pair which are connected to the same fuel line 91 receive as far as possible the same mass flow and in order to make the flow field in the central fuel tube 81 more uniform (avoidance of nonuniform distribution due to the bending of the fuel line 91 into the fuel tube 81), the transition plane from the shaft 9 to the relevant injector can be provided with a restrictor element 86 (in particular a flow screen). By way of example, FIG. 3 and, in particular, FIG. 4 illustrate a disc with a plurality of axial holes.

If hydrogen is used as the gaseous fuel, high volume flows must be moved on account of the low density of this fuel. The internal volume of the shaft 9 is therefore used to a large extent as a fuel line, otherwise than in the case of the shaft 2 for the liquid fuel, where a line of relatively small diameter is sufficient to supply the relevant injector. For this purpose, it is possible either for the shaft 9 to be produced as an individual component in such a way that it forms a fuel line in its interior (wherein the shaft 9 is in practice designed as a fuel tube) or for a separate fuel line 92 to be inserted into its interior, said fuel line being delimited with respect to a load-bearing structure 93 of the shaft 9 by a gap 94. The fuel line 92 is thus produced as an integral part of the shaft 9, e.g. by 3D printing, or is welded or brazed into the shaft 9 as a separate component. A solution is preferred in which the shaft 9 and the fuel line 91 are formed separately from one another so that the density of the hydrogen is not drastically reduced as it flows through the fuel line 91 by being heated as a result of the hot air coming from a high-pressure compressor (not shown) situated upstream of the combustion chamber 100 and flowing around the shaft 9. The gap 94 which is created in this case is used for thermal insulation of the fuel line 91 from those parts of the shaft which surround it. The gap 94 can be filled in order to optimize the thermal insulation. Air or other gases with a low heat conduction or solids, e.g. mineral wool, mineral powders or ceramic coatings, can be used as a filling.

FIG. 5 shows, in a view in the upstream direction, a detail of the annular combustion chamber 100, in which injectors of the two injector types 70, 71 for the liquid and gaseous fuel, respectively, are arranged. Two sectors of the annular combustion chamber 100 are illustrated. In this case, a combustion chamber sector is understood to mean, as is customary (cf. FIG. 2), a segment of the circumference of the combustion chamber 100 which extends from a centre between two injectors of the first injector type 70 for liquid fuel to the next centre between two injectors of the first injector type 70. Thus there is an injector for liquid fuel in the centre of each sector. As is also known from the prior art, the heat shield 5 is also divided sector by sector into individual components, such that the dividing lines between two adjacent heat shield segments coincide with the sector boundaries 101 (in axial plan view), wherein, to be precise, the individual heat shield components do not abut one another at the sector boundaries 101; instead there is a small gap in order to avoid mechanical stresses due to thermal expansion and manufacturing and installation tolerances. In the exemplary embodiment according to the invention, which is shown in FIG. 5, there are two injectors (of the second injector type 71) for the gaseous fuel for each injector for the liquid fuel, wherein in each case the two injectors of the second injector type 71, in particular of an injector pair, are spaced apart along the radial line on the sector boundaries 101. Thus, the injectors for the second injector type 71 for the gaseous fuel are arranged precisely centrally between two injectors of the first injector type 70 for liquid fuel in the circumferential direction and offset radially with respect to one another. The head wall 60 of the combustion chamber 100 and the heat shield 5 are provided with round openings of appropriately adapted shape and position. If the heat shield 5 is composed of separate components in each sector, the separate components must have correspondingly semicircular recesses 12 at their edges.

As FIG. 5 furthermore shows, a quadrilateral, the sides of which connect the four central points of two adjacent central points of injectors of the first injector type 70 to the central points of the interposed injectors of the second injector type 71, does not form a rhombus but, in most cases has the shape of a kite, as FIG. 6 illustrates. In this case, in axial plan view, a central angle α is formed between two sides that extend from the centre of the annular combustion chamber (or of the combustion chamber head 6 in the case of a pot-shaped instead of an annular combustion chamber) to the two central points of the injectors IF1, IF2 for the liquid fuel. Those angles β of the quadrilateral which are at the sides relative to the sector boundary 101 are equal, while the radially inner angle δ, which is formed around the central point of the radially inner injector for the gaseous fuel, is larger than the radially outer angle γ, which is formed from the central point of the radially further outward injector for the gaseous fuel. The reason for this geometrical arrangement of the injectors is that, in the case of an ideal rhombus shape, the radially inner injector IG 2 for the gaseous fuel would be very close to the combustion chamber inner wall. As a result, on the one hand, the flow field established would not be favourable for complete combustion and, on the other hand, the cooling air requirement for the combustion chamber inner wall to protect against thermal overloading by the flame of the radially inner injector IG 2 for gaseous fuel would be disproportionately high.

In the axial plan view of the geometrical arrangement of the injectors which is illustrated in FIG. 6, the following applies:

for the angle α between two adjacent injectors IF1, IF2 for liquid fuel: 360°/number of injectors IF for liquid fuel or 360°/number of combustion chamber sectors;

the angle β enclosed by the lines connecting one of the injectors IF1, IF2 to the adjacent injectors for the gaseous fuel IG1, IG2;

for the angle γ enclosed by the lines connecting IG1 to the two injectors IF1, IF2: 180°−α/2−β;

for the angle δ enclosed by the lines connecting injector IG2 to the two injectors IF1, IF2: 180°+α/2−β.

In the illustration in FIG. 6, by way of example, an angle β of about 60° is assumed, with an annular combustion chamber that has sixteen sectors. Depending on the configuration of the combustion chamber module 102 or combustion chamber 100, however, larger or smaller angles β are conceivable. As far as possible, these should be within the range between β=30° (as illustrated in FIG. 7) and β=90° (as illustrated in FIG. 8). In the case of a smaller angle β, the two injectors IG1, IG2 may be so close together and so close to the injectors IF1, IF2 that an unfavourable flow field and locally very hot zones are formed. Moreover, the structure of the combustion chamber head 6 is mechanically weak on account of the very close together circular openings for the injectors. An angle β of more than 90°, on the other hand, requires a combustion chamber 100 which is radially very extensive (in the region of the combustion chamber head 6). Moreover, injector IG1 is so much further away from injectors IF1 and IF2 than injector IG2 that the interaction between its fuel jet and the air flow fields generated by injectors IF1 and IF2 varies greatly and in general is much less favourable than that of the fuel jet injected by injector IG2.

FIG. 9, which shows an enlarged detail of the combustion chamber module 102 in the region of the injector arrangement in a sectional view from the side, shows a superimposition of the two injector types 70, 71 with their respective shafts 2, 9. In this case, an angle between the two central axes of the injector for the gaseous fuel and the central axis of the injector for the liquid fuel is 10° or more in the side view illustrated. As a result, improved flow conditions are created since the increased number of shafts results in a denser aerodynamic barrier for the air flowing into the outer annular gap, which flows from there (in part) into the combustion chamber via cooling holes in the radially outer combustion chamber wall in order to cool the wall, and, in addition, twice as many flanges have to be accommodated on the outer housing 4 of the combustion chamber module 102 as in the case of a combustion chamber module 102 of conventional construction owing to the addition of the injectors for the gaseous fuel. The shafts in the inner region of the combustion chamber module 102 occupy a lot of space. As a result, they form a compact aerodynamic barrier, which can lead to the injectors not receiving such a good supply of diffuser air (at least radially to the outside of the combustion chamber central axis) and an outer annular gap 13 not receiving such a good supply of the air that is required there to cool the combustion chamber wall. It may therefore be advantageous if the shafts for the two injector types 70, 71 do not run parallel to one another in side view but if their central axes enclose an angle of approximately 10° or more in side view. It is assumed here that the central axes of the shafts intersect approximately in the region of the combustion chamber central axis. The specific geometrical arrangements depend on the precise configuration of the combustion chamber module 102 and can be determined with greater accuracy, if required, by means of tests or simulation.

In order to reduce the aerodynamic barrier due to the increased number of injector shafts, it is expedient to provide these with a diameter that is as small as possible. In order nevertheless to ensure mechanical stability, the shafts can be provided with ribs 11 and 14, as shown by way of example in FIGS. 10A and 10B. In a plan view on to the central axis or longitudinal axis of the shaft, the ribs 11, 14 may be arranged either in a cross shape or, for example, like a three-pronged star relative to one another. Various shapes are conceivable in the side view thereof, such as a quadrilateral, a rounded shape, or a triangle, with a triangular shape and a cross-shaped arrangement around the shaft 9 being illustrated by way of example in FIGS. 10A and 10B. In order to reduce the aerodynamic barrier due to the ribs 11, 14, the ribs can be provided with holes 15 or large-area apertures 16. This applies especially to those ribs whose side faces are not arranged parallel to the longitudinal axis of the main flow direction, that is to say ribs 14 but not necessarily ribs 11, which may also have apertures for weight reduction, however.

The configuration according to the invention of the combustion chamber module 102 results in advantages in terms of optimization for alternate operation with liquid or gaseous fuel. In particular, advantages when using a combustion chamber module 102 according to the invention for an aero engine are also achieved.

LIST OF REFERENCE SIGNS 1 seal
10 combustion space
11 ribs
12 apertures
13 outer annular gap
14 ribs
15 holes
16 apertures
100 annular combustion chamber
101 sector boundary
102 combustion chamber module
2 shaft
3 flange
4 outer housing of combustion chamber module
5 heat shield
6 combustion chamber head
60 head wall
7 injector assembly
70 first injector type (for liquid fuel)
71 second injector type (for gaseous fuel)
8 fuel, gaseous
81 fuel tube (central)
82 annular air gap
83 entry lips
84 seal
85 opening (injectors)
86 restrictor element (flow screen)
9 shaft, common to an injector pair, gaseous fuel
91 fuel line
92 separate fuel line
93 load-bearing structure
94 gap
α central angle
β side angle
γ radially outer angle
δ radially inner angle
IG 1 injector for gaseous fuel
IG 2 additional injector for gaseous fuel
IF 1 injector for liquid fuel
IF 2 additional injector for liquid fuel

The invention claimed is:

1. A combustion chamber module having an annular combustion chamber enclosing a combustion space, a feed device for fuel, an injector assembly positioned in an annular configuration on a combustion chamber head and comprising injectors for feeding in the fuel, and a control device for controlling the feed device, wherein:
the feed device is configured for feeding in a liquid fuel and a gaseous fuel, the injector assembly includes:
injectors of a first injector type configured for feeding in the liquid fuel, and
injectors of a second injector type configured for feeding in the gaseous fuel, and
wherein the control device is configured to control the feed device such that:
in a first operating mode, the injectors of the first injector type are supplied with the liquid fuel without simultaneous supply of the gaseous fuel to the injectors of the second injector type, and
in a second operating mode, the injectors of the second injector type are supplied with the gaseous fuel without simultaneous supply of the liquid fuel to the injectors of the first injector type.

2. The combustion chamber module according to claim 1, wherein there is a simultaneous flow of air during operation through air passages present in both the injectors of the first and second injector types and any swirl elements present therein.

3. The combustion chamber module according to claim 1, wherein the injectors of the second injector type are each arranged in pairs as an injector pair on the combustion chamber head, with one of each of the pairs being located radially further in and one of each of the pairs being located radially further out.

4. The combustion chamber module according to claim 3, wherein the injectors of the first injector type are arranged alternately in a circumferential direction with the injectors of the second injector type, which are grouped in pairs.

5. The combustion chamber module according to claim 3, wherein each injector pair of the injectors of the second injector type is mounted on a common shaft, which contains a common fuel line for both injectors of the injector pair and is secured on an outer housing.

6. The combustion chamber module according to claim 1, wherein the combustion chamber head includes a head wall and a heat shield, and, for each injector of the injector assembly, has a dedicated circular opening, through which the respective injector projects into an interior of the combustion chamber.

7. The combustion chamber module according to claim 6, and further comprising a seal, is mounted in a floating manner, positioned between each injector and the respective opening to prevent air from flowing into the combustion space in an undefined manner, as a result of thermal deformation or installation and manufacturing tolerances.

8. The combustion chamber module according to claim 7, wherein the injectors of the second injector type have a central fuel tube with or without a swirl element for passing the gaseous fuel, axially into the combustion space of the combustion chamber, wherein the fuel tube is bounded by an annular air gap, which is configured to produce an axial momentum to the air flow which is sufficiently high such that zones of chemical combustion reactions are shifted away from the respective injector into the combustion space.

9. The combustion chamber module according to claim 8, wherein the annular air gaps on the injectors of the second injector type are provided with entry lips, which are arranged axially upstream of the seal.

10. The combustion chamber module according to claim 5, and further comprising a flow screen, which equalizes a mass flow of the two injectors of each injector pair with respect to one another and makes a flow field more uniform, is arranged in or close to a respective transition plane from the shaft to both injectors of each injector pair connected to the common fuel line.

11. The combustion chamber module according to claim 5, wherein the common fuel line forms a one-piece integral part of the shaft, which is produced by 3D printing, or is produced as a separate component and is connected in a stable manner to the shaft, by welding or brazing.

12. The combustion chamber module according to claim 11, wherein the shaft and the common fuel line are separated from one another by a thermally insulating gap, wherein the gap is unfilled or filled with air or some other gas or with a solid of low thermal conductivity.

13. The combustion chamber module according to claim 1, wherein:
the annular combustion chamber is divided, when viewed in an upstream direction, into sectors, wherein each of the sectors forms a segment of a circumference of the combustion chamber which extends from a center, forming a radial sector boundary, between two injectors of the first injector type to a next center, forming a further radial sector boundary, between two injectors of the first injector type, and
the two injectors of each injector pair of the injectors of the second injector type are arranged in matching recesses on the sector boundaries.

14. The combustion chamber module according to claim 13, wherein the combustion chamber head includes a heat shield, wherein the heat shield is composed of heat shield segments, radially extending dividing lines of which, when viewed in the upstream direction, coincide with the sector boundaries apart from a small gap, to compensate for mechanical stresses due to thermal expansion and manufacturing and installation tolerances.

15. The combustion chamber module according to claim 3, wherein lines connecting central points of two injectors of the first injector type which are adjacent in a circumferential direction to the central points of the two injectors of an injector pair of the second injector type which lie in a center therebetween on a radial line, form a quadrilateral diamond, of which an angle that is located radially further in is greater than an angle thereof that is located radially further out and of which two angles are located laterally with respect to the radial line are equal and in a range of from 30° to 90°.

16. The combustion chamber module according to claim 5, wherein central longitudinal axes of the shafts of the first injector type and of the shafts of the second injector type do not run parallel, but run at an angle of 10° or greater to one another, in side view.

17. The combustion chamber module according to claim 16, wherein the shafts of the injectors of the second injector type, include ribs that project outwards, radially, in axial plan view and that are include apertures.

18. An engine including at least one of the combustion chamber module according to claim 1.

19. A combustion chamber module having an annular combustion chamber enclosing a combustion space, a feed device for fuel, and an injector assembly positioned in an annular configuration on a combustion chamber head and comprising injectors for feeding in the fuel, wherein:
the feed device is configured for feeding in a liquid fuel and a gaseous fuel,
the injector assembly includes:
injectors of a first injector type configured for feeding in the liquid fuel, and
injectors of a second injector type configured for feeding in the gaseous fuel, and
the feed device is controllable such that the injectors of the first injector type and the injectors of the second injector type are not supplied simultaneously with fuel;
wherein the annular combustion chamber is divided, when viewed in an upstream direction, into sectors, wherein each of the sectors forms a segment of a circumference of the combustion chamber which extends from a center, forming a radial sector boundary, between two injectors of the first injector type to a next center, forming a further radial sector boundary, between two injectors of the first injector type, and
wherein the two injectors of each injector pair of the injectors of the second injector type are arranged in matching recesses on the sector boundaries.

20. A combustion chamber module having an annular combustion chamber enclosing a combustion space, a feed device for fuel, and an injector assembly positioned in an annular configuration on a combustion chamber head and comprising injectors for feeding in the fuel, wherein:
the feed device is configured for feeding in a liquid fuel and a gaseous fuel,
the injector assembly includes:
injectors of a first injector type configured for feeding in the liquid fuel, and
injectors of a second injector type configured for feeding in the gaseous fuel, and the feed device is controllable such that the injectors of the first injector type and the injectors of the second injector type are not supplied simultaneously with fuel, wherein the combustion chamber head includes a head wall and a heat shield, and, for each injector of the injector assembly, has a dedicated circular opening, through which the respective injector projects into an interior of the combustion chamber, a seal, is mounted in a floating manner, positioned between each injector and the respective opening to prevent air from flowing into the combustion space in an undefined manner, as a result of thermal deformation or installation and manufacturing tolerances, wherein the injectors of the second injector type have a central fuel tube with or without a swirl element for passing the gaseous fuel, axially into the combustion space of the combustion chamber, wherein the fuel tube is bounded by an annular air gap, which is configured to produce an axial momentum to the air flow which is sufficiently high such that zones of chemical combustion reactions are shifted away from the respective injector into the combustion space.

* * * * *